United States Patent
Mawhinney et al.

(10) Patent No.: US 6,269,082 B1
(45) Date of Patent: Jul. 31, 2001

(54) SYSTEM AND METHOD FOR MULTIPLEXING A FRAME RELAY VIRTUAL CIRCUIT AND FOR PERFORMING NON-DISRUPTIVE DIAGNOSTICS THROUGH A CIRCUIT USING ASYNCHRONOUS TRANSFER MODE

(75) Inventors: Ted Nodine Mawhinney, Clearwater; Richard Allen Mundwiler, Safety Harbor; Lee Hampton Lester, Jr., St. Petersburg, all of FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/079,048

(22) Filed: May 14, 1998

Related U.S. Application Data

(63) Continuation-in-part of application No. 08/888,410, filed on Jul. 7, 1997, now Pat. No. 5,898,674.
(60) Provisional application No. 60/070,067, filed on Dec. 30, 1997.

(51) Int. Cl.[7] .................................................. H04B 3/46
(52) U.S. Cl. ......................................... 370/247; 251/395
(58) Field of Search ................................... 370/241–247, 370/248–252, 392, 503, 395; 379/1, 2, 10, 12

(56) References Cited

U.S. PATENT DOCUMENTS

| | | |
|---|---|---|
| 5,234,564 | 8/1993 | Lespagnol et al. . |
| 5,245,614 | 9/1993 | Gutman et al. . |
| 5,291,484 | 3/1994 | Tomita et al. . |
| 5,315,588 | 5/1994 | Kajiwara et al. . |
| 5,315,591 | 5/1994 | Brent et al. . |
| 5,353,336 | 10/1994 | Hou et al. . |
| 5,371,731 | 12/1994 | Pratt et al. . |
| 5,452,306 | 9/1995 | Turudic et al. . |
| 5,481,544 | 1/1996 | Baldwin et al. . |
| 5,490,141 | 2/1996 | Lai et al. . |
| 5,550,827 | 8/1996 | Fernstrom . |
| 5,654,966 * | 8/1997 | Lester, Jr. et al. ................. 370/392 |
| 5,898,674 * | 4/1999 | Mawhinney et al. .............. 370/247 |
| 5,898,689 * | 4/1999 | Kumar et al. ...................... 370/253 |
| 6,038,219 * | 3/2000 | Mawhinney et al. .............. 370/242 |
| 6,178,184 * | 1/2001 | Petty ................................... 370/503 |

FOREIGN PATENT DOCUMENTS

0774846 * 6/1997 (EP) ................................. 370/392

* cited by examiner

Primary Examiner—Salvatore Cangialosi
(74) Attorney, Agent, or Firm—Thomas, Kayden, Horstemeyer & Risley LLP

(57) ABSTRACT

The present invention relates to a system and method for creating multiple logical channels across a single virtual circuit on a hybrid asynchronous transfer mode (ATM)/frame relay network and an ATM network. The logical channels include a single primary channel and multiple secondary channels. The secondary channels are created by the addition of a secondary channel flag and secondary header to the user information field of the data frames transmitted. Also, one of the secondary channels is designated as a diagnostic channel for conducting diagnostics across the virtual circuit. The diagnostic channel is reserved exclusively for diagnostic data traffic from an ATM digital service unit (DSU) to a frame relay DSU, or in the alternative, to a second ATM DSU.

42 Claims, 11 Drawing Sheets

| Application | End - to - End Signaling | | |
|---|---|---|---|
| Presentation | | | |
| Session | | | |
| Transport | | | |
| Network | Q.931 | X.25 Packet | Frame Relay |
| Data Link | Q.921 (LAPD) | | |
| Physical | I.430 Basic Rate Interface and I.431 Primary Rate Interface | | |

Monitor Pattern Function Sequence

| Transmitter Device | | | | Receiver Device | |
|---|---|---|---|---|---|
| Frame Type | Address | Message Type | Seq. # | Monitor Pattern | DTE |
| Multiplexed | 63 | Pattern Message | 1 | ⟶ Valid | |
| Transparent | None | n/a | n/a | ⟶ User | ⟶ |
| Multiplexed | 1 | n/a | n/a | ⟶ User | ⟶ |
| Multiplexed | 63 | Pattern Message | 2 | ⟶ Valid | |
| Multiplexed | 1 | n/a | n/a | ⟶ User | ⟶ |
| Transparent | None | n/a | n/a | ⟶ User | ⟶ |
| Multiplexed | 63 | Pattern Message | 3 | ⟶ Valid | |
| Multiplexed | 63 | Pattern Message | 4 | Dropped | |
| Multiplexed | 63 | Pattern Message | 5 | ⟶ Error | |

Fig. 7A

Loopback Test Sequence

| Transmitter Device | | | | Receiver Device | |
|---|---|---|---|---|---|
| Frame Type | Address | Message Type | Seq. # | Monitor Pattern | DTE |
| Multiplexed Valid | 63 | Pattern Message | 1 | | |
| Transparent | None | n/a | n/a | ⟶ User | ⟶ |
| Multiplexed | 1 | n/a | n/a | ⟶ User | ⟶ |
| Multiplexed Valid | 63 | Pattern Message | 2 | | |
| Multiplexed | 1 | n/a | n/a | ⟶ User | ⟶ |
| Transparent | None | n/a | n/a | ⟶ User | ⟶ |
| Multiplexed Valid | 63 | Pattern Message | 3 | | |
| Multiplexed | 63 | Pattern Message | 4 | Dropped | |
| Multiplexed Error | 63 | Pattern Message | 5 | | |

Fig. 7B

SYSTEM AND METHOD FOR MULTIPLEXING A FRAME RELAY VIRTUAL CIRCUIT AND FOR PERFORMING NON-DISRUPTIVE DIAGNOSTICS THROUGH A CIRCUIT USING ASYNCHRONOUS TRANSFER MODE

CLAIM OF PRIORITY AND CROSS-REFERENCE TO RELATED APPLICATIONS

This application is a continuation-in-part of U.S. patent application Ser. No. 08/888,410, filed on Jul. 7, 1997, now U.S. Pat. No. 5,898,674 and entitled "System and Method for Performing Non-disruptive Diagnostics through a Frame Relay Circuit," incorporated herein by reference, which, in turn, is a continuation-in-part of U.S. Pat. No. 5,654,966, filed on Nov. 14, 1995, and entitled "Circuit and Method for Multiplexing a Frame-Relay Virtual Circuit and Frame-Relay System Having Multiplexed Virtual Circuits," incorporated herein by reference. This application further claims priority to United States Provisional Patent Application Ser. No. 60/070,067 filed on Dec. 30, 1997, and entitled "Extension of Frame-Relay Virtual Circuit Multiplexing and Diagnostics to ATM Networks," incorporated herein by reference.

FIELD OF THE INVENTION

The present invention generally relates to hybrid frame relay/asynchronous transfer mode (ATM) networks and ATM networks, and more particularly to a system and method for creating multiple logical channels on a single virtual circuit across a hybrid frame relay/ ATM network or an asynchronous transfer mode network, and for performing network diagnostics.

BACKGROUND OF THE INVENTION

Modem communications networks often include a number of paths or links that are interconnected to route voice, video, and/or data (hereinafter collectively referred to as "data") traffic from one location of the network to another. At each location, an interconnect node couples a plurality of source nodes and destination nodes to the network. In some cases, the sources and destinations are incorporated in a private line network that may include a series of offices connected together by leased-lines with switching facilities and transmission equipment owned and operated by the carrier or service provider and leased to the user. This type of network is conventionally referred to as a "circuit-switching network." Accordingly, a source node of one office at one location of the network may transmit data to a destination node of a second office located at another location of the network through their respective switching facilities.

At any given location, a large number of source nodes may desire to communicate through their respective switching facilities, or interconnect node, to destination nodes at various other locations of the network. The data traffic from the various source nodes is first multiplexed through the source switching facility, then demultiplexed at the destination switching facility and finally delivered to the proper destination node. A variety of techniques for efficiently multiplexing data from multiple source nodes onto a single circuit of the network are presently employed in private line networks. For instance, time division multiplexing ("TDM") affords each source node full access to the allotted bandwidth of the circuit for a small amount of time. The circuit is divided into defined time segments, with each segment corresponding to a specific source node, to provide for the transfer of data from those source nodes, when called upon, through the network.

Other data communications systems, in contrast, have not been as successful employing multiplexing techniques to enhance network efficiency further. In particular, frame-relay networks offer far fewer alternatives than their circuit-switching network counterparts. Frame-relay networks are often referred to as "packet-switching networks." Packet-switching networks, as opposed to circuit-switching networks, allow multiple users to share data network facilities and bandwidth rather than providing a specific amount of dedicated bandwidth to each user, as in TDM. Instead, packet switches divide bandwidth into connectionless, virtual circuits. As is known, virtual circuit bandwidth is consumed only when data is actually transmitted. Otherwise, the bandwidth is not used. In this way, packet-switching networks essentially mirror the operation of a statistical multiplexer (whereby multiple logical users share a single network access circuit).

One problem, however, with such traditional virtual circuits relates to the throughput efficiency in frame-relay and other packet-switching networks. For instance, a one-to-one correspondence exists between applications and frame-relay virtual circuits, there being no inherent mechanism in today's frame-relay standards for transporting end-to-end data management. Internet Engineering Task Force Request for Comments ("ETF RFC") 1490 "Multiprotocol Interconnect Over Frame Relay," herein incorporated by reference, provides the ability to multiplex protocols, but forces the end-to-end data management data and the data communicated on to a single logical channel on a given virtual circuit. Additionally, IETF RFC 1490 protocol headers appear on every single frame transmitted over the circuit.

A second problem with traditional frame relay networks is that they are limited by the data rates that are achievable. Specifically, in order to achieve data transmission rates greater than 1.5 Mbps (mega bits per second), most network service providers use Asynchronous Transfer Mode (ATM) which can provide data transmission rates of up to 44 Mbps. However, current data transmission using an ATM network or a hybrid ATM/frame relay network is without acceptable systems and methods to perform diagnostics that are compatible with existing frame relay networks across the virtual circuit.

SUMMARY OF THE INVENTION

The present invention is directed to a system and method for creating multiple logical channels on a single virtual circuit in a hybrid ATM/frame relay or ATM network, and for performing network diagnostics. The present invention provides for a single primary channel and multiple secondary channels which may be employed to communicate data across a hybrid ATM/frame relay or ATM network. The ATM DSU in the network comprises a microprocessor, a serial communications controller (SCC) circuit, segment assembler/reassembler (SAR) circuit, and a memory coupled to a common local interface such as a data bus. The ATM data service unit (DSU) transmits and receives data, respectively, to and from the ATM network through the SAR circuit. Likewise, the ATM DSU transmits and receives data, respectively, to and from one or more data communication devices through the SCC circuit.

Stored in the memory is operating logic to perform several tasks including creating the secondary channels by adding a secondary channel flag octet and secondary header octet at the beginning of the user information field of the data frame to be communicated. The secondary channel flag and secondary header are added by the DSU's in the system. Since the secondary channel information is added to the user information field, the logical channels created thereby are transparent to the virtual circuit itself. Data frames that are communicated via the primary channel do not receive the secondary channel flag or the secondary header. If the first octet of the user information field of a data frame to be communicated across the primary channel is equal to the secondary channel flag, then an additional secondary channel flag octet is added after this first octet. Upon encountering the two secondary channel flag octets, a receiving DSU will throw out one of them and pass on the remaining octet as user data to the primary channel destination. Note that a data frame which is sent on the primary channel features no additional overhead, thereby saving on transmission costs.

Accordingly, there is also provided a method for communicating a data frame across a hybrid ATM/frame relay or ATM network via multiple logical circuits. The method comprises the steps of determining the primary or secondary logical channel which is to be used to transmit a data frame. If the data frame is to be communicated on the primary channel, the system performs the steps of determining whether the first octet of the user data field is equal to the secondary channel flag, and, adding an additional channel flag after the first octet if the first octet is equal to the secondary channel flag. If the first octet of the user data field is not equal to the secondary channel flag, then the data frame is communicated across the network as is. If the data frame is to be communicated on any one of the plurality of secondary channels, then the steps of adding a secondary channel flag and a secondary header to the user information field of the data frame, and, transmitting the data frame across the network are performed. Upon receiving the data frame, the DSU performs the steps of determining whether the data frame is assigned to the primary or one of the plurality of secondary channels. If assigned to the primary channel, the step of transmitting the data frame to the primary channel destination is performed. If the first octet of the user information field of the data frame received is equal to the secondary channel flag, then the receiving DSU performs the step of determining whether the second octet of the user information field is also equal to the secondary channel flag. If so, then the steps of removing the second octet, and, transmitting the data frame to the primary channel destination are performed. If the second octet is not equal to the secondary channel flag, then the step of transmitting the data frame to the secondary channel destination indicated by the secondary header which is the value stored in the second octet.

According to a second aspect of the present invention, the ATM DSU further includes operating logic stored in the memory to perform diagnostics including designating one of the plurality of secondary logical channels for diagnostic communication by assigning a unique diagnostic channel address; generating a test sequence in a data frame that is assigned to the diagnostic logical channel; transmitting the data frame across the network; identifying received data traffic assigned to the diagnostic logical channel; generating a response sequence responsive to a test sequence received on the diagnostic logical channel, the response sequence being assigned to the diagnostic logical channel; placing the test sequence into the data traffic transmitted across the virtual circuit; placing the response sequence into the data traffic transmitted across the virtual circuit; and evaluating a test executed by the transmission of the test sequence and the response sequence across the diagnostic logical channel.

The method for performing non-disruptive diagnostics includes the steps of designating one of the plurality of logical channels for diagnostic communication by assigning a unique diagnostic channel address, generating a test sequence, assigning the test sequence to the diagnostic logical channel, and transmitting the test sequence between the first and second devices by placing the test sequence into the data traffic transmitted across the virtual circuit on the diagnostic channel. In response to this transmitted test sequence, the present method also includes the steps of generating a response sequence responsive to the test sequence, assigning the response sequence to the diagnostic logical channel, and transmitting the response sequence between the first and second devices by placing the response sequence into the data traffic transmitted across the virtual circuit. Finally, the method further comprises the steps of identifying data traffic received by the first and second devices that is assigned to the diagnostic logical channel, and, evaluating a test executed by the transmission of the test sequence and the response sequence across the diagnostic logical channel.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIGS. 7A, 7B, and 7C are diagrams illustrating example diagnostic transmissions in accordance with the preferred embodiment of the present invention;

DETAILED DESCRIPTION OF THE PREFERRED EMBODIMENT

The preferred embodiment of the invention relates to frame relay communications over an asynchronous transfer mode network, and, accordingly, the description provided herein will focus on frame relay communications accomplished via such a network. But first, a more general overview is presented, which illustrates the relationship between frame relay communications and the seven-layer OSI model.

Figures 1A, 1B:
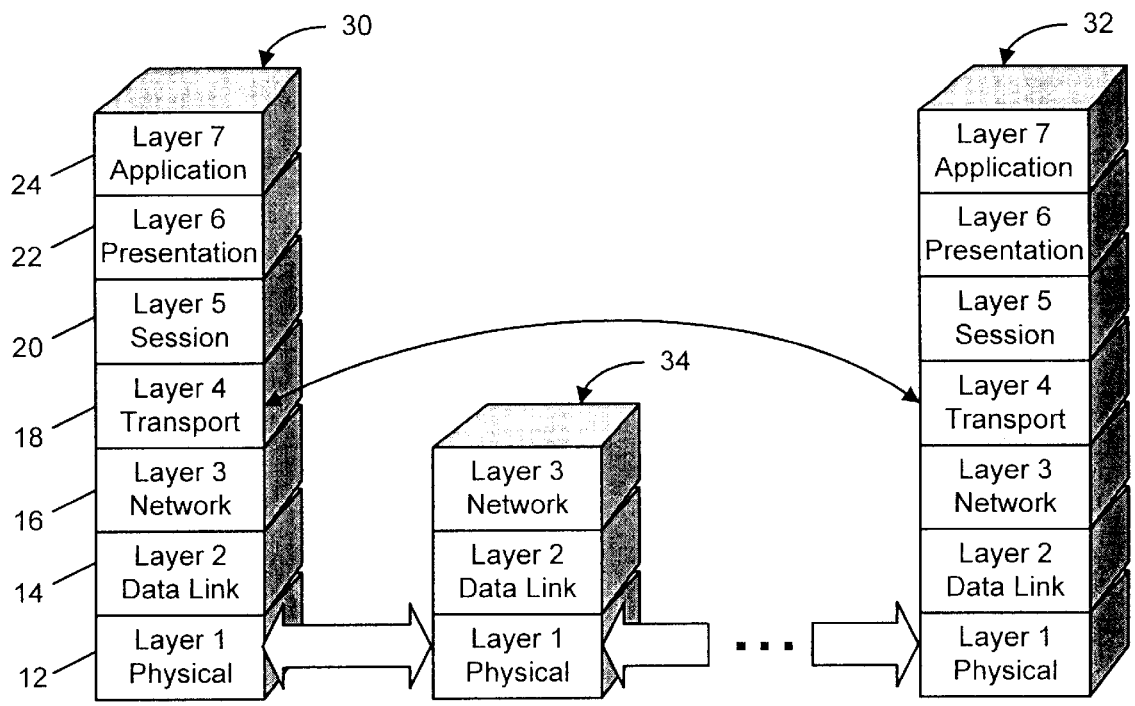
FIG. 1A is a diagram illustrating the standardized seven-layer OSI model.
FIG. 1B is a diagram illustrating the implementation of frame relay technology in relation to the OSI model of FIG. 1A.

In this regard, FIGS. 1A and 1B are diagrams that illustrate frame relay communications in accordance with the seven-layer OSI model. Turning first to FIG. 1A, as is now well known, the physical layer 12 is concerned with the transmission of unstructured bit streams over a physical link. The physical layer 12 involves parameters such as signal voltage swing and bit length or duration. It further deals with the mechanical, electrical, and procedural characteristics necessary to establish, maintain, and deactivate a physical link. The data link layer 14 is responsible for providing the dependable communication of data across the physical link. In this regard, the data link layer 14 transmits blocks of data with the necessary synchronization, error control, and flow control. The network layer 16 is responsible for establishing, maintaining, and terminating connections, and it insulates the upper layers from the details or burden of data transmission. The transport layer 18 serves to provide dependable transfer of data between end points. Error recovery and flow control are also provided the transport layer 18. The session layer 20 operates to establish, maintain, and terminate connections, or sessions, between applications running at the end points and intercommunicating with one another. In this regard, the session layer 20 provides the control structure for communicating between the end point applications. The presentation layer 22 operates to perform data transformation in order to provide a standardized application interface and to provide common communication services. The application layer 24 provides services to the users of the OSI-compliant system. Network management transaction servers and file transfer protocols are examples of application layer services.

While FIG. 1A illustrates the entire seven-layer model, the present invention is concerned with communications that primarily take place at the network layer 16. FIG. 1A illustrates the connection and communication between two end points 30 and 32 through one or more intermediate device 34. In this regard, it is appreciated that the applications executing on the end points 30 and 32 are compliant with the seven-layer OSI model. As is well known, intermediate devices (such as intermediate nodes within the frame relay network) need not operate according to all seven layers. Instead, they may operate only on the physical layer 12 (such as repeaters); on both the physical layer 12 and data link 14 layers (such as host devices); or on the physical layer 12, data link layer 14, and network layer 16 (such as gateways and routers). In this regard, the first three layers are often referred to collectively as the "physical layers." The transport layer 18, as previously mentioned, is responsible for end to end communications. An example of a layer four communications protocol is Transport Control Protocol (TCP). In accordance with TCP, a device 30 may specify a communication to be directed to end point device 32. Intermediate devices 34 are responsible for ensuring that the communication packet is received by device 32.

Referring to FIG. 1B, a diagram illustrates various ITU-T specifications or recommendations, in relation to the layers of the OSI model. Specifically, the 1.430 basic interface and the 1.431 primary interface recommendations specify physical layer transfer-transactions. ITU-T specification Q.921 (LAPD) is provided for communications at the data link layer. ITU-T specification Q.931 governs network layer transactions for ISDN D channel control signaling in circuit mode connections. For packet-switched circuits, X.25 protocol standard is provided for governing D channel signaling. Frame relay control and signaling is also provided at the network layer 16.

While frame relay technology is concerned with packet routing and delivery, it realizes improved performance over X.25. Although X.25 provides better link-by-link flow and error control, frame relay provides a more streamlined communications process. Specifically, as is known, the protocol functionality required at the user-network interface is reduced. In this regard, call-control signaling is carried on a separate logical connection from user data, and therefore intermediate nodes need not maintain state tables or process messages relating to call control on an individual per-connection basis. In addition, there is no hop-by-hop flow control and error control. Instead, end-to-end flow control and error control are the responsibility of a higher layer, if employed at all.

Figure 2:
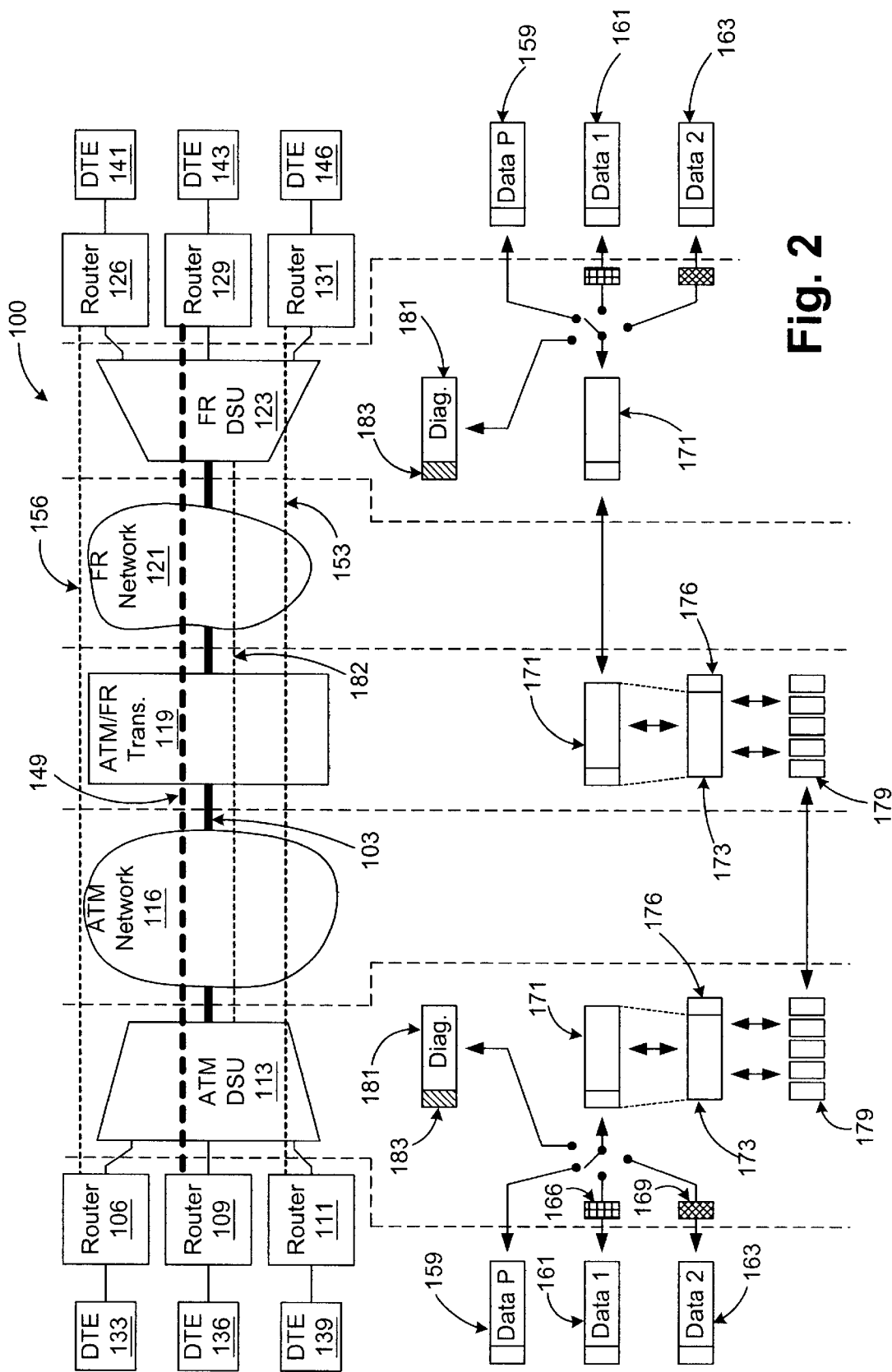
FIG. 2 is a block diagram illustrating a hybrid ATM/frame relay network according to the present invention.

Referring now to FIG. 2, shown is a system diagram that illustrates a frame-relay or packet switching network 100 that multiplexes multiple logical channels on a single permanent virtual circuit 103 over a hybrid ATM/frame relay network. The network 100 includes first routers 106, 109, and 111 which are coupled to an ATM data service unit (DSU) 113. The ATM DSU 113 is electrically coupled to an ATM network 116 which in turn is coupled to an ATM/frame relay translation device 119. The ATM/frame relay translation device 119 is coupled to a frame relay network 121 which is coupled to a frame relay DSU 123. The frame relay DSU 119 is coupled to second routers 126, 129, and 131.

The first routers 106, 109, and 111 are coupled to the first data terminal equipment (DTE) 133, 136, and 139. Likewise, the second routers 126, 129, and 131 are coupled to second DTEs 141, 143, and 146. It is understood that each DTE 133, 136, 139, 141, 143, and 146 can be a single DTE or may represent multiple DTEs as known in the art, the actual numbers shown being for purposes of illustration. Likewise, the ATM DSU 113 can accommodate more than three first routers 106, 109, and 111 and the frame relay DSU 123 can accommodate more than three second routers 126, 129, and 131, the actual numbers shown being for purposes of illustration.

The first and second DTEs 133, 136, 139, 141, 143, and 146 generate data to be transmitted across the virtual circuit 103, and, according to the preferred embodiment, the data generated is in data frames according to frame relay format.

According to a first aspect of the present invention, there are multiple logical channels between the ATM DSU 113 and the frame relay DSU 123. One of these logical channels is designated as a primary logical channel 149. Also included are secondary logical channels 153 and 156. According to the preferred embodiment, the ATM DSU 113 is configurable to have up to sixty-three secondary logical channels. Each secondary logical channel may be configured to communicate between first routers 106, 109, 111 and second routers 126, 129, 131, or between the DSU's 113 and 123 for diagnostics as will be described.

The network 100 facilitates the communication between the first and second DTEs in the following manner. The flow of data is described herein as occurring from the first DTEs 133, 136, and 139 to the second DTEs 141, 143, and 146. However, it is understood that the flow may occur in the opposite direction.

First, the data frames 159, 161, and 163 are generated by the first DTEs 133, 136, and 139 and sent to the routers 106, 109, and 111. The first routers 106, 109, and 111 send the data frames 159, 161, and 163 to the ATM DSU 113 which assigns the data frames 159, 161, and 163 to a specific logical channel by including a logical channel designation 166, 169 in the data frames 161 and 163. In the preferred embodiment, the logical channel designation 166, 169 is comprised of a secondary channel flag and a secondary channel header placed at the beginning of the data portion of the data frame 161, 163. Note that no logical channel designation is included in the data frame 159 as this data frame is transmitted across the primary channel 149 which does not require further channel designation as will be discussed.

At this point, each data frame 159, 161, 163 becomes a data frame payload 171 for the ATM DSU 113 to shuttle across the ATM network 116. Note in FIG. 2 that the data frames 159, 161, 163 are shown converging onto the single data frame payload 171. It is understood that this is to illustrate that each data frame 159, 161, 163 becomes a data frame payload 171 individually. That is to say, the data frames 159, 161, 163 are not combined onto a single data frame payload 171, but transmitted one at a time. The particular function or value of the data in the data frame payload 171 is transparent to the ATM DSU 113.

The data frame payload 171 is next reduced to an ATM data sequence 173 in which a trailer 176 is added as is customary in ATM data communication. Next, the ATM data sequence 173 is separated into fifty-three byte cells 179 for transmission across the ATM network 116 as is commonly known to those skilled in the art. The fifty-three byte cells 179 are transmitted across the ATM network 116 and are received by an ATM/frame relay translation device 119. The ATM/frame relay translation device 119 performs the reverse functions of the ATM DSU 113 converting the fifty-three byte cells 179 back into an ATM data sequence 173, thereby extracting the data frame payload 171.

The data frame payload 171 is then communicated to the frame relay DSU 123 through the frame relay network 121. The frame relay DSU 123 ascertains the logical channel of the data frame payload 171 from its header. The data frame 159, 161, 163 is then sent to the corresponding second router 126, 129, or 131 based on the logical channel 166, 169 assigned to the data frame 159, 161, 163 which then directs the data frame 159, 161, 163 to the proper DTE 141, 143, 146.

According to a second aspect of the present invention, one of the sixty-three secondary logical channels is reserved for channel diagnostics, the channel becoming a diagnostic logical channel 182. The ATM DSU 113 is capable of creating a diagnostic data frame 181 which comprises a test sequence to be transmitted across the virtual circuit 103 via a reserved diagnostic logical channel 182. The diagnostic data frame 181 is assigned to the diagnostic channel by adding the diagnostic channel designation 183 (i.e., the particular secondary channel designation) to the diagnostic data frame 181. This is accomplished by the addition of an appropriate secondary channel flag and secondary header to the user data field of the diagnostic data frame 181 as will be discussed. Once generated, the diagnostic data frame 181 is transmitted to the frame relay DSU 123 across the permanent virtual circuit 103 in like manner to the data frames 159, 161, and 163. When a diagnostic data frame 181 is received by the frame relay DSU 123, or by the ATM DSU 113 if transmitted by the frame relay DSU 123, the diagnostic data frame is identified by the diagnostic channel designation 183. The frame relay DSU 123 and the ATM DSU 113 then interpret the data in the diagnostic data frame 181, performing the specific diagnostic task which the diagnostic data was sent to execute, and responding accordingly, sending any responsive information via the diagnostic logical channel 182.

Figure 3:
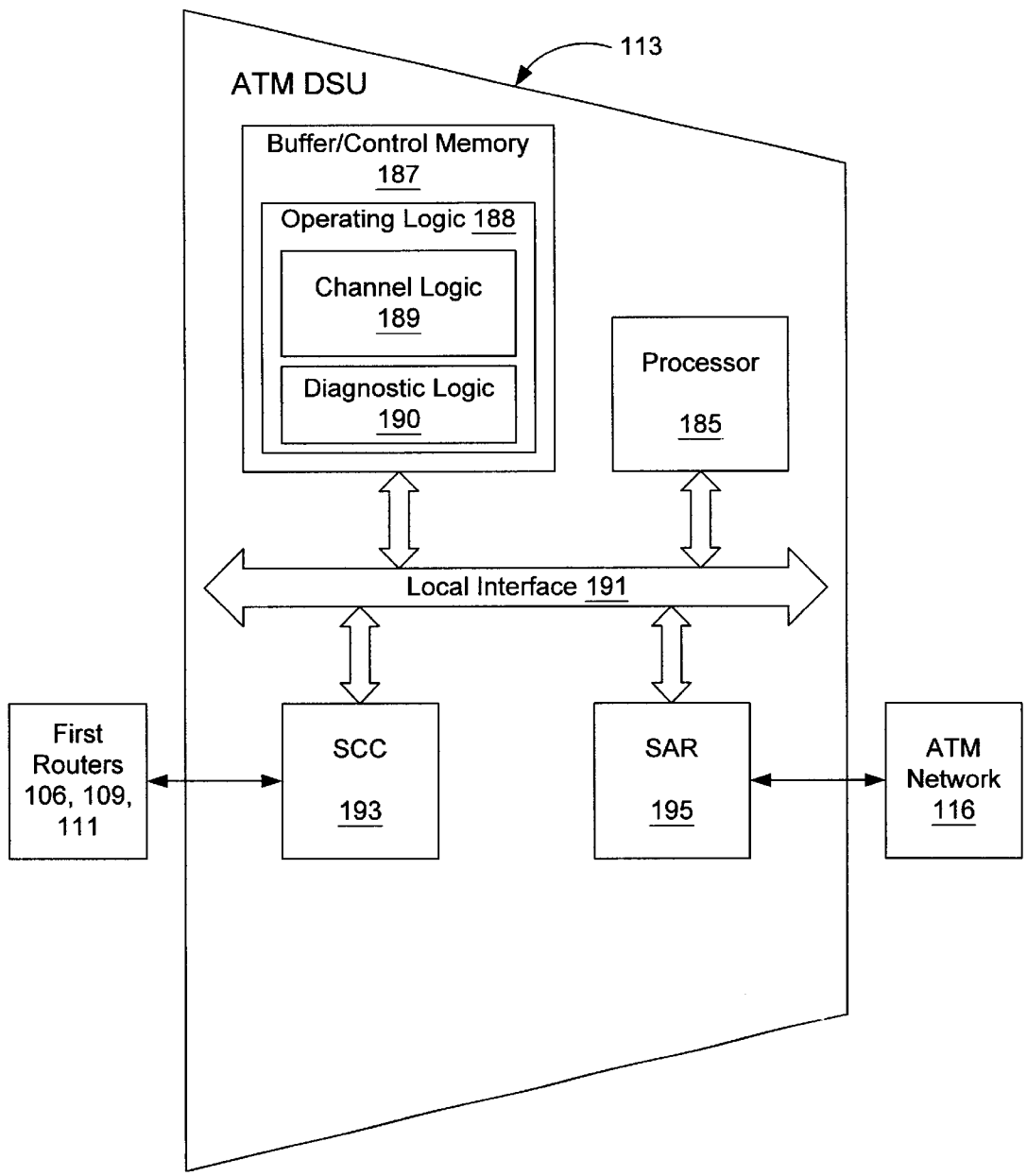
FIG. 3 is a block diagram of the ATM digital service unit (DSU) employed in the hybrid ATM/frame relay network of FIG. 2.

Referring next to FIG. 3, shown is an ATM DSU 113 according to the preferred embodiment. The ATM DSU 113 features a microprocessor 185 and a buffer/control memory 187 on which operating logic 188 is stored. The operating logic 188 includes channel logic 189 to create the logical channels 153, 156, and 182 (FIG. 2). The operating logic 188 also includes diagnostic logic 190 for performing diagnostic functions according to the second aspect of the present invention. The microprocessor 185 is in electrical communication with the buffer/control memory 187 via the local interface 191. Also, electrically coupled to the local interface 191, are a serial communication controller circuit (SCC circuit) 193 and a segment assembler/reassembler circuit (SAR circuit) 195. The local interface 191 may be a data bus or similar data communication pathway. The SCC circuit is in electrical communication with the first routers 106, 109, and 111 (FIG. 2), the SCC circuit 193 transmitting and receiving data from the first routers 106, 109, and 111. The SAR circuit 195 is in electrical communication with an ATM network 116 (FIG. 2), the SAR circuit transmitting and receiving data from the ATM network 116. It is possible that the buffer/control memory 187 may comprise a separate control memory and a separate buffer memory, rather than a single memory device used for both purposes.

The operation of the ATM DSU 113 generally begins by receiving one of the data frames 159, 161, 163 (FIG. 2) from one of the first routers 106, 109, 111 (FIG. 2) which communicate with the SCC 193. The particular data frame 159, 161, or 163 is stored in the buffer/control memory 187. There, the microprocessor 185, acting pursuant to the operating logic 188, arranges the data frame 159, 161, or 163 into ATM format 176 (FIG. 2) and appropriate header information is added. Finally, the data frame 159, 161, or 163 in ATM format 176 is sent to the SAR circuit 195 where it is reformed in the fifty-three byte cells 179 to be transmitted across the ATM network 116. The above functions are performed pursuant to the operating logic 188 and are not discussed in detail herein.

It is noted that the discussion herein relating to the hybrid ATM/frame relay network 100 (FIG. 2) also applies to a network in which only ATM DSU's 113 are employed, being coupled on both ends of a single ATM network 116 (FIG. 2).

Figure 4:
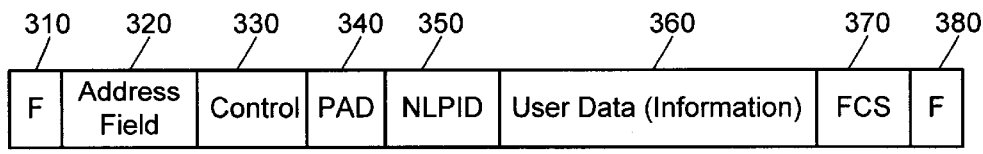
FIG. 4 is a diagram illustrating an example of a data frame communicated across the hybrid ATM/frame relay network of FIG. 2.

Turning now to FIG. 4, illustrated is a data frame 300 suitable for transmission over the packet-switching network 100 (FIG. 2). While the illustrated data frame 300 is formatted in a Q.922 frame, other frame formats compatible with a frame-relay network are well within the scope of the present invention. The data frame 300 comprises a first flag field 310, an address field 320, a control field 330, a pad field 340, a NLPID field 350, a user information field 360, a frame check sequence ("ECS") field 370 and second flag field 380.

The first and second flag fields 310, 380 signify the beginning and the end of the data frame 300. The address field 320 provides the destination in a hybrid ATM/frame-relay network (e.g. the first DTE 141 coupled through second router 126 to the frame relay DSU 123 in FIG. 2) for the data frame 300 to travel across a single frame-relay virtual circuit. The control field 330 identifies control information for the Q.922 format. The value of the control field 330 is typically O×O3 for a Q.922 frame unless negotiated otherwise. The pad field 340 is used to align the remainder of the frame to a two octet boundary. There may be zero or one pad octet within the pad field 340 and, if present, it has a value of zero. The NLPID field 350 is administered by the International Standards Organization ("ISO") and the Consultative Committee International Telegraph & Telephone (now the International Telecommunication Union—ITU). It contains values for many different protocols including, for instance, the Internet Protocol ("IP") and the Institute of Electrical and Electronics Engineers Subnetwork Access Protocol ("IEEE SNAP"). The NLPID field 350 relates to the receiver the protocol that is being used by the data frame 300.

A data portion of the user information field 360 carries the substantive data between destinations in the frame-relay network. Additionally, a first and second octet of the user information field 360 carries the secondary channel flag and the secondary channel header designating the particular secondary channel, when necessary, which are generated by the logical channel creation circuit of the present invention. Finally, the FCS field 370 assures the data integrity of the data frame 300.

There is no single implemented frame size for the data frame 300 in a frame-relay network. Generally, the maximum will be greater than or equal to 1600 octets, but each frame-relay provider will specify an appropriate value for its network. Data terminal equipment (DTE) in a hybrid ATM/frame-relay network, therefore, allows the maximum acceptable frame size to be configurable. Conversely, the minimum frame size allowed for the data frame 300 in a frame-relay network is five octets between the first and second flag fields 310, 380 assuming a two octet address field 320. This minimum increases to six octets for a three octet address field 320 and seven octets for a four octet address field 320.

Figure 5A:
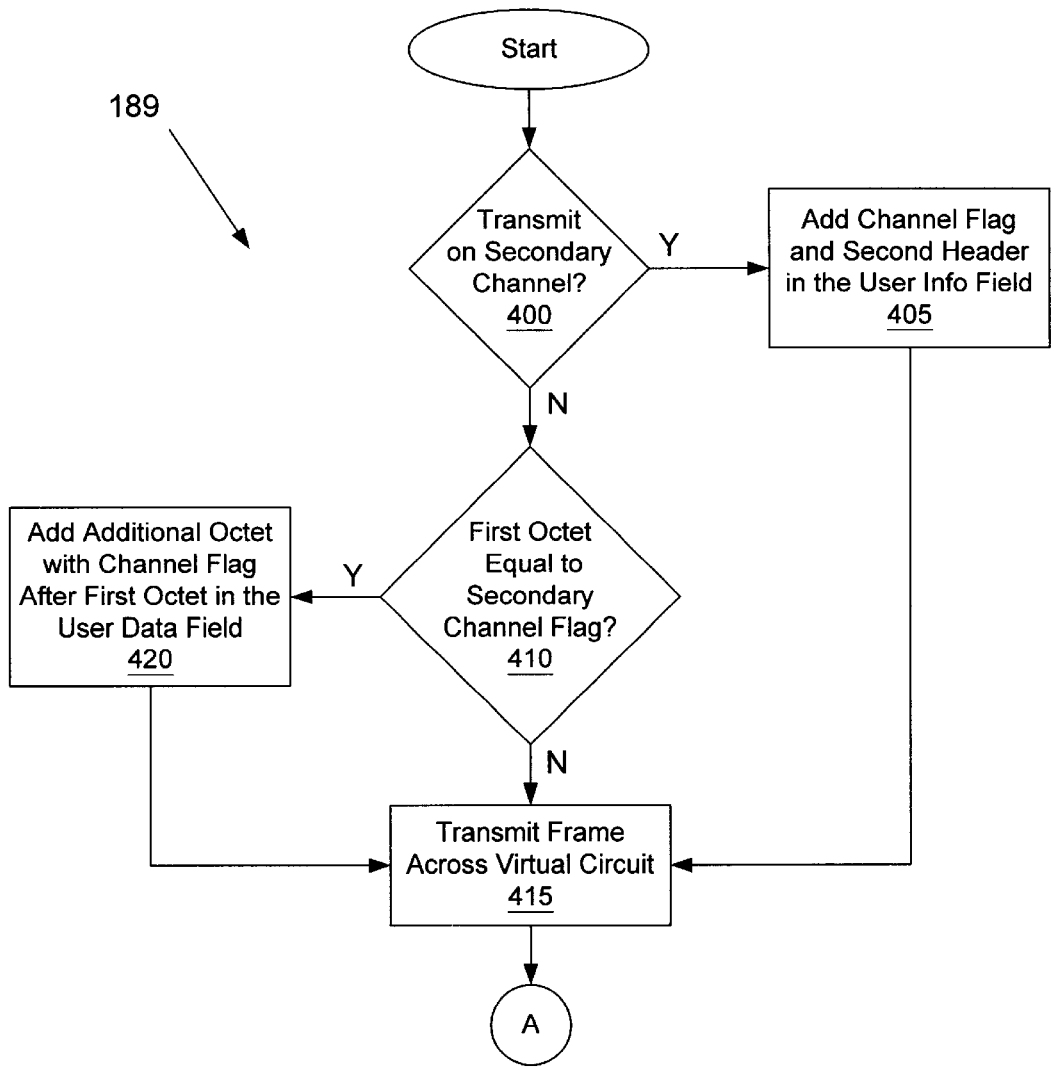
FIG. 5A is a flow diagram illustrating the operating logic of FIG. 3 for transmitting data on the primary and secondary channels of FIG. 2.
Figure 5B:
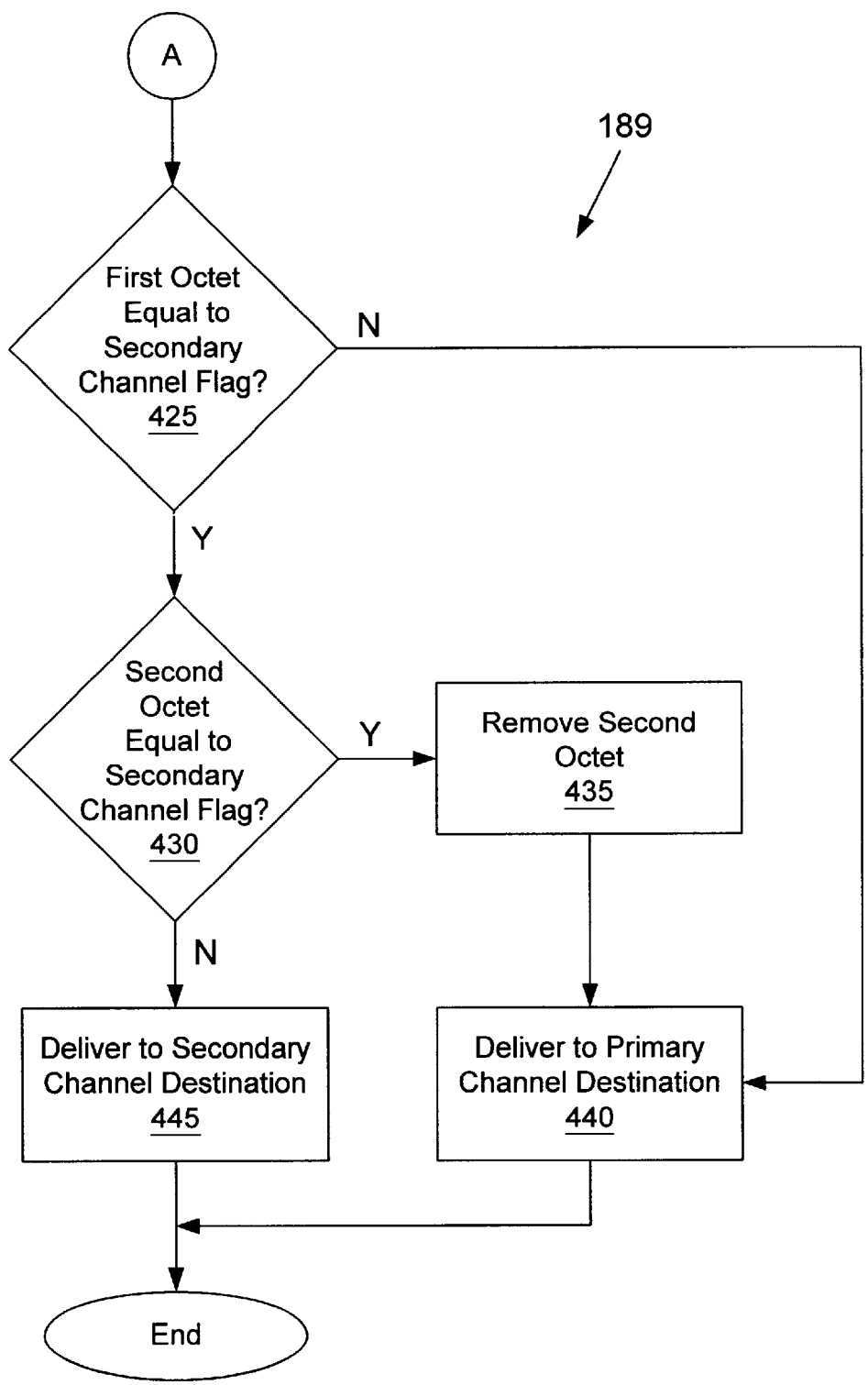
FIG. 5B is a flow diagram illustrating the operating logic of FIG. 3 for receiving data on the primary and secondary channels of FIG. 2.

With reference to FIGS. 5A and 5B, shown is a flow chart illustrating the channel logic 189 of FIG. 3 executed in creating the logical channels 149, 153, 156 (FIG. 2). Beginning with block 400, the logical channel is determined which is to be used to transmit the data frame 159, 161, 163 (FIG. 2) in question.

If the data frame 159, 161, 163 is to be transmitted across a secondary channel 153, then the channel logic moves to block 405 where a secondary channel flag is placed at the beginning of the user information field 360 (FIG. 4) followed by a secondary header which indicates the specific secondary channel 153 over which the data frame 159, 161, 163 is to be transmitted.

If, on the other hand, in block 400, the data frame 159, 161, 163 is to be transmitted across the primary channel 149 (FIG. 2), then the channel logic 189 moves to block 410 in which the first octet of the user information field is examined to determine whether it is equal the secondary channel flag. If this first octet is not equal to the secondary channel flag, then the channel logic moves to block 415 in which the data frame 159, 161, 163 is transmitted across the virtual circuit. Likewise, after the secondary channel flag and secondary header is added to the user data field in block 405, then the channel logic 189 moves to block 415 where the data frame 159, 161, 163 is transmitted across the virtual circuit.

Referring once again to block 410, if the first octet of the user information field is equal to the secondary channel flag, then the channel logic 189 moves to block 420 in which an additional octet equal to the secondary channel flag is added after the first octet in the user information field 360. This is done to signal the receiving side that the first octet is in fact user data and not a channel flag as will be discussed. After the additional octet, which is equal to the secondary channel flag, is added after the first octet in user data field, the channel logic moves once again to block 415 in which the data frame 159, 161, 163 is transmitted across the virtual circuit. After the data frame 159, 161, 163 is transmitted across the virtual circuit in block 415, the channel logic 189 moves to connector A which connects to the channel logic 189 employed on the receiving side in FIG. 5b.

Once the data frame 159, 161, 163 is received the channel logic 189 moves to block 425 in which the first octet of the user information field 360 is examined to see if it is equal to the secondary channel flag. If in block 425 the first octet of the user information field 360 is equal to the secondary channel flag, then the channel logic 189 moves to block 430 in which the second octet of the user data field is examined to see if it is equal to the secondary channel flag as well. If in block 430, the second octet of the user information field 360 is equal to the secondary channel flag, the channel logic moves to block 435 in which this second octet is removed from the user information field 360. Thereafter, in block 440, the data frame 159, 161, 163 is delivered to the primary channel destination. Likewise, referring back to block 425, if the first octet is not equal to the secondary channel flag, then the channel logic 189 moves to block 440 in which the data frame 159, 161, 163 is delivered to the primary channel destination.

If in block 430, the second octet is not equal to the secondary channel flag, then the channel logic reverts to block 445 in which the data frame 159, 161, 163 is delivered to the secondary channel destination as indicated by the second octet which is a header indicating the particular secondary logical channel 153 to which the data frame 159, 161, 163 has been assigned.

Note that the channel logic 189 detailed above provides distinct advantages. In particular, the secondary logical channels 153 are created by adding a secondary channel flag and header to the beginning of the user data field. This allows the user to multiplex data from several different data sources onto one virtual circuit, thereby avoiding the need for further virtual circuits as the header of the data frame 159, 161, 163 is unchanged. Thus, one may establish several channels of data communication across a single virtual circuit which saves the cost of purchasing the use of multiple virtual circuits from a network provider. Also, additional overhead in the form of the secondary channel flag and header is only incurred when a secondary channel is employed. Otherwise, data may be sent via the primary channel with no additional overhead incurred, providing further cost savings.

Using the system and method described above, the second aspect of the present invention involves a method and system for performing channel diagnostics. Specifically, the present invention dedicates or reserves one of the plurality of logical channels that are multiplexed upon a single virtual circuit as the diagnostic logical channel 182 (FIG. 2). This reserved channel is used exclusively for channel diagnostics, and in this way operates non-disruptively with the rest of the user traffic across the virtual circuit. It will be appreciated that, in accordance with the multiplexing system and method described above, since dedicated time slots are not reserved for the various logical channels, the channels are said to be "statistically" multiplexed on a single virtual circuit.

Therefore, at times when diagnostic commands and messages are not being exchanged across the virtual circuit, more bandwidth is available for other user or data traffic.

Figure 6:
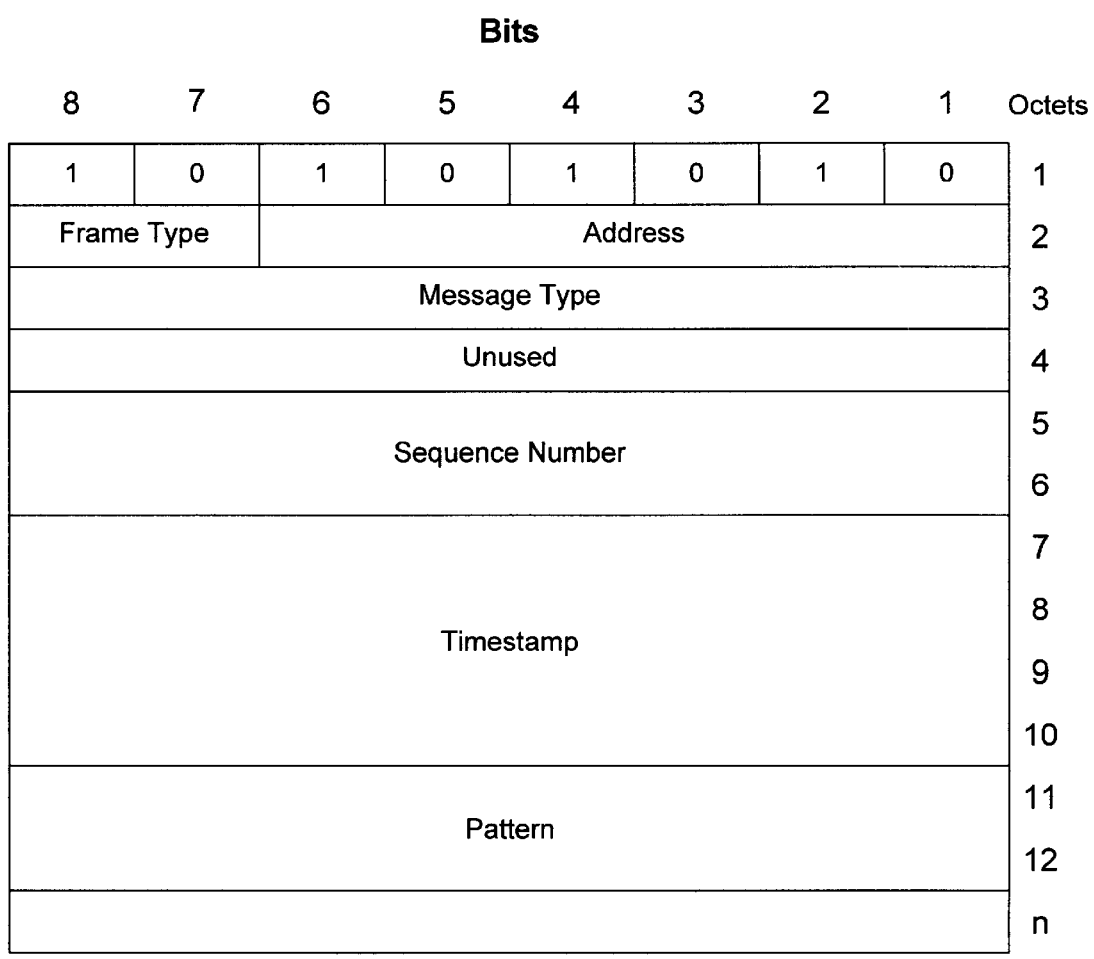
FIG. 6 is a diagram illustrating an example of a header attached to the data frame of FIG. 4.

Referring now to FIG. 6, a preferred frame format for messages transmitted across the diagnostic logical channel 182 (FIG. 2) is shown. As illustrated, the preferred frame format is of variable octet length, depending in part upon the type of test being executed. For example, whether the test is a connectivity test, a loopback test, or a pattern test, and further whether pattern or other information is being transmitted as a part of the message. The first two octets define the multiplexing header. The frame type, of octet 2, specifies that the present packet is a multiplexed packet. The address, of octet 2, specifies the address that uniquely identifies the reserved or dedicated diagnostic logical channel 182. A diagnostic header immediately follows the multiplexing header of octets 1 and 2, and comprises octets 3–10 (preferably). Elements included within the diagnostic header include the message type, sequence number, and time stamp. The message type is used to indicate the type and disposition of the present frame. For example, whether the test is a pattern test, a connectivity test, a loopback test, etc.

In accordance with the preferred embodiment of the present invention, various message types and their definitions are identified in Table 1 immediately below.

TABLE 1

| Message Type | Definition |
| --- | --- |
| Pattern Message | Identifies a frame generated by a Send Pattern function |
| Connectivity Request | Identifies a frame generated by a Connectivity Test indicator |
| Connectivity Response | Identifies a frame generated in response to a Connectivity Request |
| Start Send Pattern Command | Commands a far-end access unit to initiate a Send Pattern function |
| Start Loopback Command | Commands a far-end access unit to initiate a Loopback function |
| Start Monitor Pattern Command | Commands a far-end access unit to initiate a Monitor Pattern function |
| Stop Send Pattern Command | Commands a far-end access unit to terminate a Send Pattern function |
| Stop Loopback Command | Commands a far-end access unit to terminate a Loopback function |
| Stop Monitor Pattern Command | Commands a far-end access unit to terminate a Send Pattern function |

Of course, a number will be inserted in the message type field, of octet 3, that corresponds to the various message types listed in the table. In addition, other diagnostic tests, messages, or commands may be provided. As will be appreciated by those skilled in the art, pattern tests transmit a continuous stream of frames having known data values. A device on the receiving end will be instructed as to the pattern type and sequence, and thus will know the particular pattern and sequence of data that it expects to receive. It can then monitor the pattern data and sequence received over the diagnostic channel to verify whether that channel is, in fact, properly transmitting data. The accurate reception of data will indicate to the receiving unit that the transmission line defined by the virtual circuit is in good and proper working order. Faulty data will be an indication that there is some type of error or system fault along or within the virtual circuit. In accordance with the connectivity test, a handshake sequence is performed on the diagnostic channel to determine the state of the virtual circuit, as well as the state of the distant access unit. Typically, a connectivity test is initiated by a user interface command. A loopback test is typically run in conjunction with a send pattern and/monitor pattern command. When loopback is active on a virtual circuit, all frames received on the diagnostic logical channel 182 of that circuit are transmitted back to the originating device. The originating device, then, after transmitting a pattern, will monitor the diagnostic logical channel 182 to evaluate whether the transmitted packet is in fact received. By monitoring the integrity of the received, loopbacked results, the transmitting device can evaluate the condition of the virtual circuit.

In keeping within the description of FIG. 6, a sequence number will typically be utilized for tests in which sequence checking is required. Finally, a time stamp may be used for certain tests, when, for example, calculating the round trip transmission time. The final portion of the frame format illustrated in FIG. 6 is designated as "Pattern". This portion of the frame is utilized in connection with pattern testing in the manner described above, and as will be further described below. It will be appreciated that the second aspect of the present invention is directed to the broader feature of the designation or reservation of a multiplexed logical channel for purposes of providing non-disruptive diagnostics. The actual performance and evaluation of the various diagnostic tests are presented herein for purposes of illustration.

As is known in frame relay technology, some errors will invariably be encountered occasionally across any virtual circuit. These errors result from a variety of reasons. Traffic congestion often leads to errors. For example, during a transient time of peak usage, an intermediate node within the frame relay network may become congested with data traffic from various sources. If so much data is received as to fill up the intermediate node's buffer space, then the node often, by design, drops packets. Therefore, even during normal operation, and with no physical fault in the data path, a virtual circuit may lose packets. Utilizing the sequence number, a transmitting device may look for acknowledgments of the various packets transmitted. If a return/acknowledgment is received out of sequence, the transmitting device will know that intermediate packets were dropped. In this regard, the permanent virtual circuit of a frame relay differs from other packet transmitting technologies, such as intermediate protocol (IP) routers. In this regard, in a virtual circuit, the same intermediate route is utilized for all data packets transmitted. In contrast, IP routers route data packets based on a number of factors, and, as a result, packets transmitted from a transmitting node to a receiving node through a number of intermediate nodes may not all be transmitted along the same route or succession of intermediate nodes.

Figure 7C:
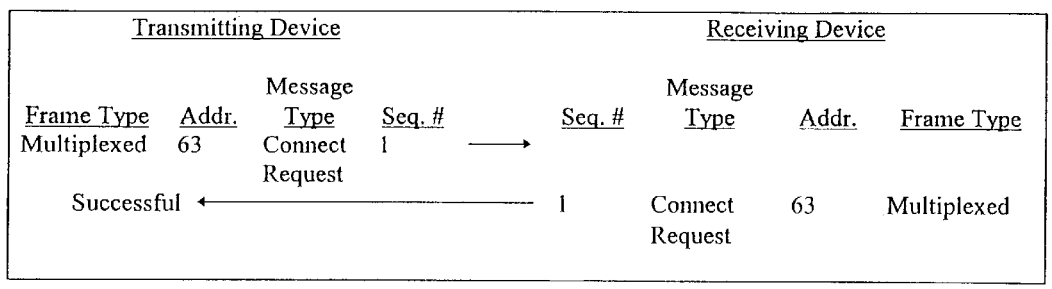

In keeping with the discussion of various diagnostic tests which may be utilized in connection with the present invention, reference is now made to FIGS. 7A, 7B, and 7C. In this regard, FIG. 7A is directed to a sequence executed in connection with a monitor pattern function. The monitor pattern function is typically executed in conjunction with a send pattern function, and is used to evaluate the sequence, data content, and delivery rate of the received packets. The rate of packet receipt is expected to equal the implementation-specific rate of packet generation used for the send pattern. Accordingly, each frame received on the diagnostic channel is evaluated for conformity to the previously specified frame format. The message type is expected to contain a type of pattern message. The sequence number is expected to contain a value of one for the first frame, and then is sequentially incremented monotomically thereafter, for each subsequent frame. The pattern element is expected to contain the pattern created by the send pattern test. In performing a monitor pattern diagnostics, the monitor pattern function is said to be in synchronization if a predetermined (e.g., implementation-specific) number of packets are received with a valid message type, the expected sequence number, and a validated diagnostic pattern or payload. All of this should occur within an interval of time that is consistent with the implementation-specific rate of packet generation. If any one or more of the foregoing criteria are not met, the monitor pattern function may be deemed to be out of synchronization, thereby indicating a failed condition or fault on the communication link or deterioration of service.

The diagram in FIG. 7A illustrates traffic, not just along the diagnostic channel, but across the virtual circuit in general. In this regard, the second column of FIG. 7A, entitled Address, lists address values of the various data frames. Those entries having an address of 63 (for purposes of illustration) are deemed to be packets transmitted along the diagnostic channel. The corresponding message types for each of these packet transmissions is "Pattern Message", and the fourth column, entitled "Sequence", provides the sequence number associated with the packets. Immediately to the right of the sequence column, is a column of horizontally directed arrows, which illustrate the transmission of the data across the virtual circuit. The first four columns of the diagram are associated with the transmitting device, while the fifth column (to the right of the arrows) is associated with receiving device. As will be appreciated, the transmitted pattern represents the data packets transmitted from a transmitting device, while the received pattern reflects actions that occur at the receiving device. For example, before the transmissions which are illustrated in FIG. 7A occur, each device (both the transmitting and receiving device) would be commanded into their respective modes of operation. In accordance with the message types and definitions provided in Table 1 above, the receiving device could transmit a command, (across the diagnostic channel) to the transmitting device to start a send pattern command. Alternatively, the transmitting device could transmit a command to the receiving device to start the monitor pattern command. Either of the above-described commands would cause the two end devices to enter the modes for the pattern test operation illustrated in FIG. 7A.

In keeping with the discussion of FIG. 7A, both devices will be synchronized or instructed as to the particular pattern that is transmitted. As is illustrated by the arrows between columns 4 and 5, packet sequence numbers 1, 2, and 3 are all successfully transmitted across the virtual circuit, and therefore the receiving unit indicates valid patterns for each. However, for any of a number of reasons, the packet of sequence number 4 is dropped along the virtual circuit. Since frame relay does not provide individual packet acknowledgments (as does X.25 protocol) the transmitting unit is not aware that the packet is dropped. Likewise, the receiving unit is not aware that the packet is dropped until it receives the packet for sequence number 5. At that time, the receiving unit knowing that the previously received packet was sequence number 3, detects a sequence error. Upon detecting this error, appropriate corrective action may be taken. This further corrective action will not be described in detail herein, as it is outside the scope of the present invention. Suffice it to say, the action could comprise sending a message back to the transmitting device to instruct it that an error has occurred, transmitting a message back to the transmitting unit requesting further diagnostics be performed, alerting a system operator that an error was encountered, which system operator may then advise a service provider of the error, or any of a number of other corrective actions may be taken.

FIG. 7B illustrates testing conducted in accordance with a loopback test. Loopback tests are typically run in conjunction with a send pattern and/monitor pattern test. When loopback is active on a virtual circuit, all frames received at the diagnostic channel of that circuit are transmitted back to their originating device. Thus, for example, if a device decides to initiate a diagnostic sequence, it may instruct a far end node to enter into loopback testing, so that the transmitting device may evaluate its own transmission results. Accordingly, in loopback type testing, the receiving node need not be aware of the particular patterns that are transmitted by the transmitting device, since it need not make an independent determination or evaluation of the packets received.

The diagram of FIG. 7B, like that of FIG. 7A, specifies an address of 63 to correspond to the diagnostic channel. The message type for the various diagnostic messages is "Pattern Message". The arrows directed from left to right indicate transmissions from a transmitting device to a receiving device. From the right hand side of the diagram, arrows directed first downwardly, then to the left illustrate the loopback of the transmitted message from the receiving device to the transmitting device. The diagram of FIG. 7B illustrates the same transmission sequences (1, 2, 3, 4, and 5, with 4 being dropped), as were illustrated in FIG. 7A. As in the diagnostic illustration of FIG. 7A, the diagnostic sequence of FIG. 7B does not detect a sequence error until the loopback of pattern message 5 is received by the transmitting device.

The reason, at least in this embodiment, is that the transmitting unit will transmit message packet 4, and while monitoring the diagnostic channel for the packet for loopback return, the transmitting device also transmits pattern message 5. However, by receiving the loopback sequence 5 before receiving sequence 4, the transmitting device detects the sequence error, and therefore identifies a fault in the permanent virtual circuit. In an alternative embodiment (not shown) the transmitting device may be configured such that it receives loopback transmissions before transmitting the next sequence package in the pattern test. If a loopback package is not received within a predetermined period of time (i.e., time out), then the transmitting device would signal a sequence error. In such an embodiment, the transmitting device would have detected the dropped package associated with pattern message sequence 4, before transmitting packet sequence number 5.

In addition to the errors depicted in FIGS. 6A and 6B, errors could also be diagnosed if the pattern received by the receiving device (FIG. 7A embodiment) did not correlate with the expected pattern. Likewise, errors could be diagnosed if the pattern received back by the transmitting device (FIG. 7B embodiment) did correlate with the originally transmitted pattern.

As a final example, reference is made to FIG. 7C, which illustrates the transmissions associated with a connectivity test. When a connectivity function is active on a virtual circuit, a connectivity request frame is transmitted on the diagnostic channel, and a connectivity response frame is awaited. The receiving device, upon receipt of a connectivity request frame, responds with a connectivity response frame. A given connectivity test is said to be successful if a valid connectivity response package is received within a predetermined period of time. When a connectivity response package is received, the test is declared successful. The test is deemed to be unsuccessful if a predetermined period of time passes without receipt of a connectivity response. A successful transmission of this single packet test is illustrated in FIG. 7C. As the name indicates, a connectivity test merely tests the integrity/continuity of the virtual circuit. The pattern test, which extends over a relatively large number of frame packets, provides a better measure of other parameters, such as lost packets, due to congestion or other intermittent errors that may occur in the virtual circuit.

Figure 8:
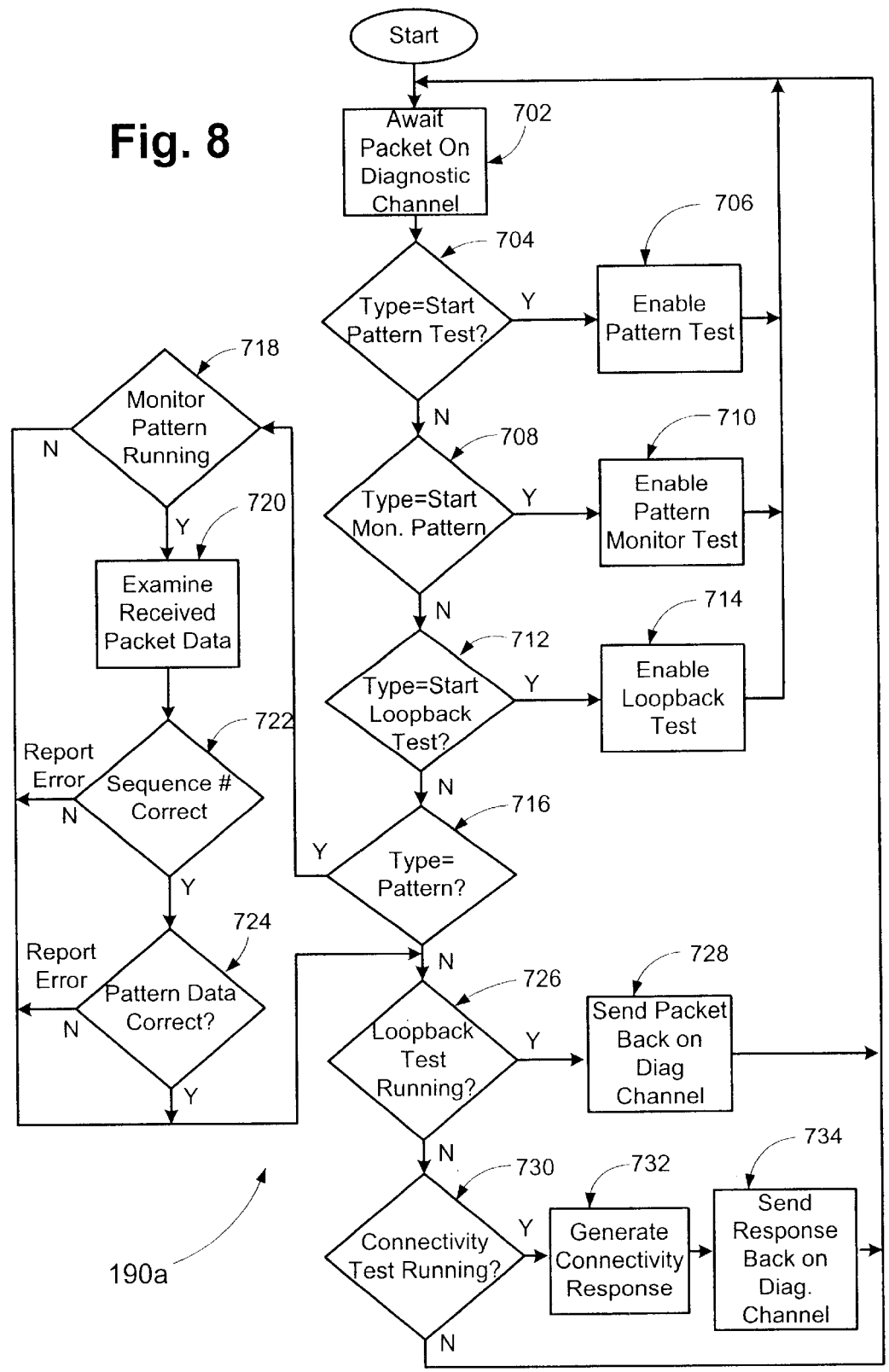
FIG. 8 is a flow diagram illustrating the operating logic of FIG. 3 for receiving diagnostic data.
Figure 9:
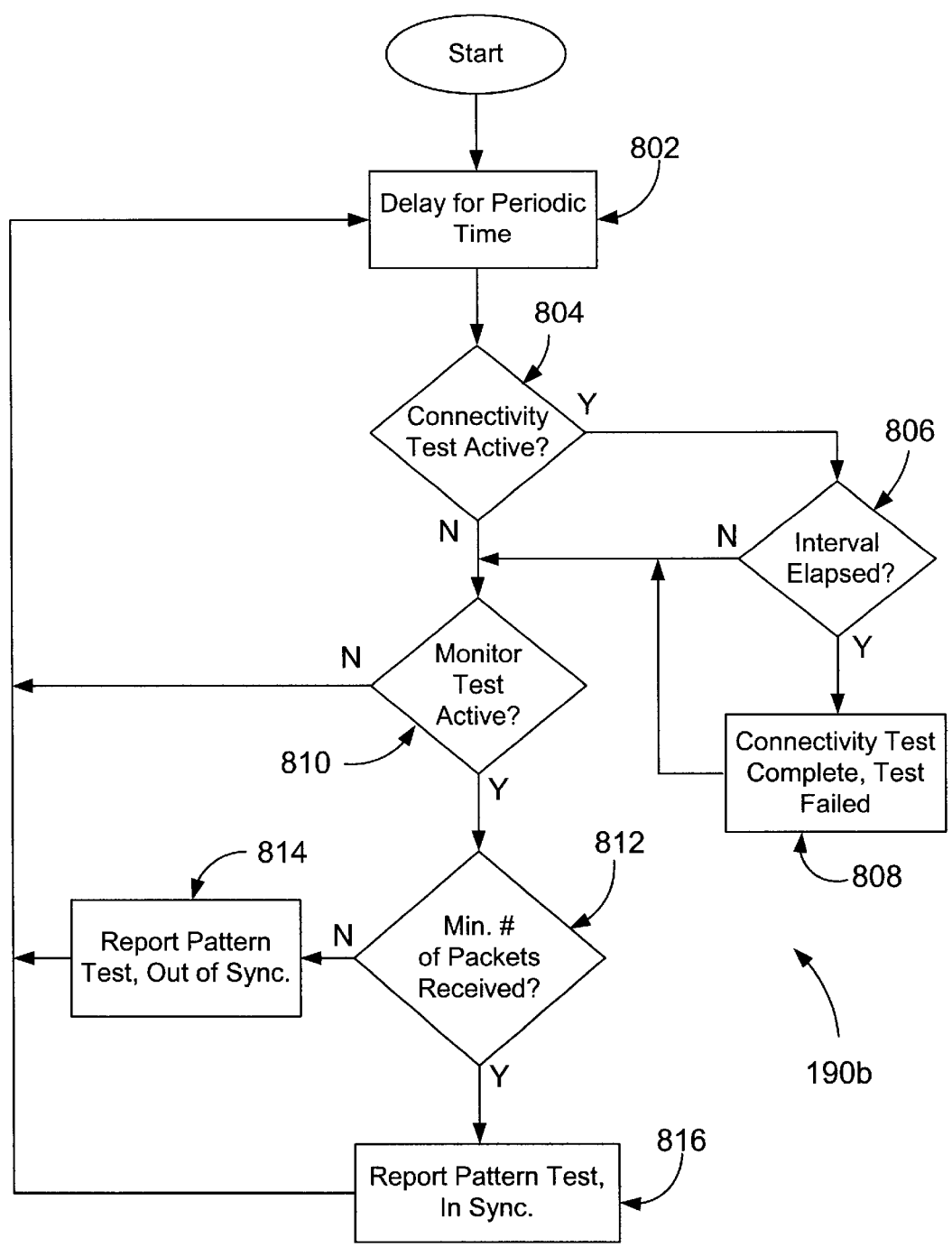
FIG. 9 is a flow diagram illustrating the operating logic of FIG. 3 for a receiver-side periodic monitor process.
Figure 10:
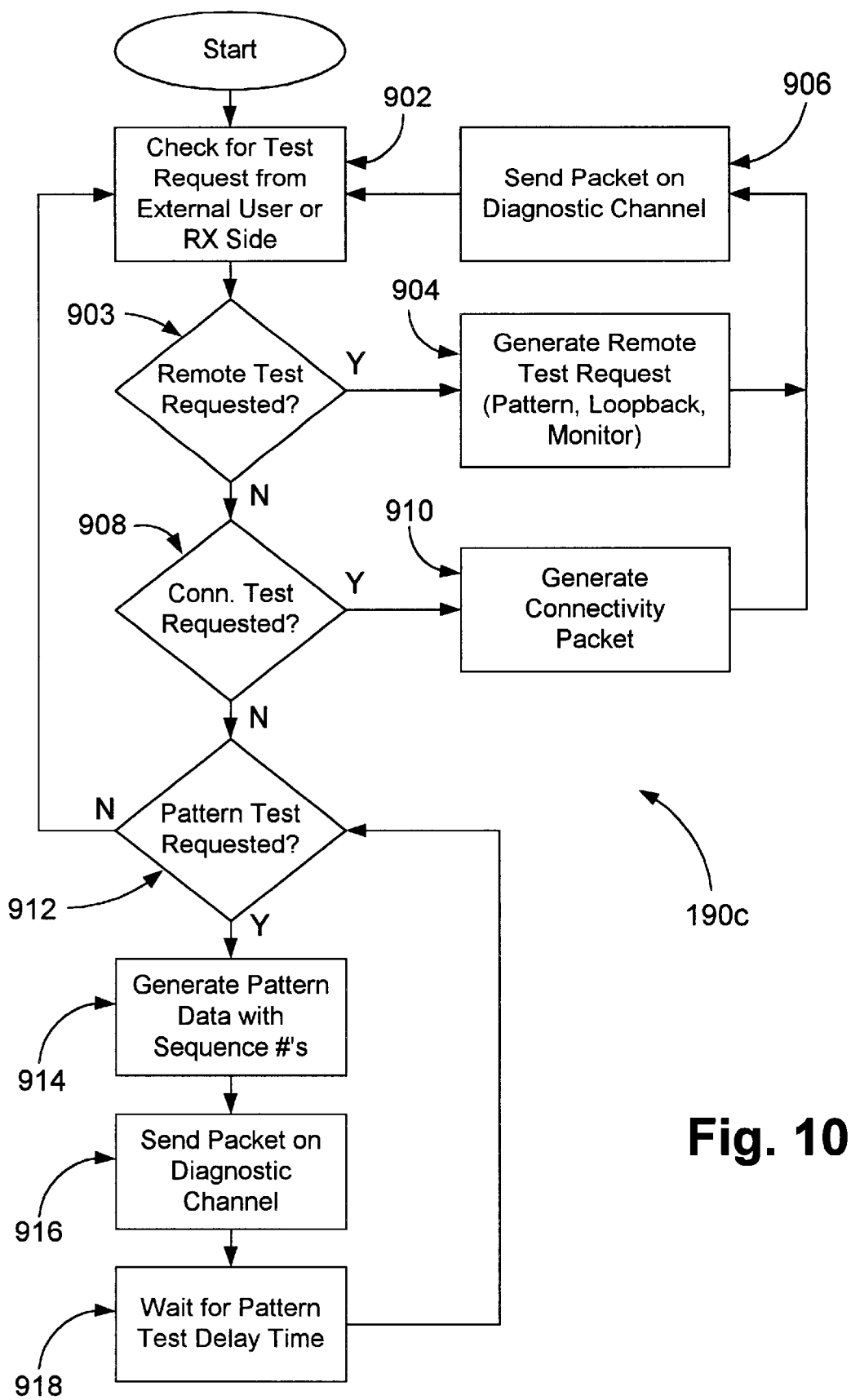
FIG. 10 is a flow diagram illustrating the operating logic of FIG. 3 for a transmitter-side operation in accordance with the preferred diagnostic process.

Having illustrated the concepts of the diagnostic functions by way of examples, reference is now made to FIGS. 8, 9, and 10 which are flowcharts depicting the top-level operation of the diagnostic logic 190 (FIG. 3) according to the second aspect of the present invention. As an initial note, the use of the term transmission device or receiving device herein reflects only a particular mode of operation. It will be appreciated that the same physical device implements both the transmission and receiving functions. Reference is made to devices as transmitting devices and receiving devices merely for purposes of illustration, to discuss particular operational features of the physical devices.

Having said this, reference is made to FIG. 8 which illustrates the architecture, functionality, and operation of the diagnostic logic 190a guiding a receiving device. At step 702, the device awaits the receipt of a packet of information on the diagnostic channel. Of course, this packet of information could be a packet in a test sequence, it could be a test instruction or command, or any other message packet in accordance with the invention. Upon receiving the packet on the diagnostic channel, the receiving device evaluates the packet to determine if it is a start pattern test command (step 704). If so, the receiver enables the pattern test routine (step 706). Otherwise, the system proceeds to step 708, where it determines if the received packet is a command to start monitor pattern testing. If so, the receiver enables its pattern monitor test (step 710).

If the test of step 708 resolves to NO, the receiver determines whether the received packet is a command to start loopback testing (step 712). If so, then it enables its loopback testing (step 714). Otherwise, it looks to the message type element of the packet to determine whether it is a pattern test (step 716). If so, then it determines whether a monitor pattern test is running (step 718). If so, it examines the received data packet to determine both whether the packet contains the correct sequence number and if so, whether the pattern data contained within the packet is correct (steps 720, 722, and 724). If either the sequence number is incorrect or the pattern data itself is inaccurate, the system reports an error.

At step 726, the receiver evaluates whether a loopback test is running. If so, then it transmits the packet back to the transmitting device on the diagnostic channel (step 728). If step 726 resolves to NO, then the system presumes a connectivity test is running. This may be presumed or, as illustrated, may be separately tested at step 730. If, a connectivity test is running, then the receiver generates the appropriate connectivity response and sends a response back to the transmitting device on the diagnostic channel (steps 732 and 734).

Turning now to FIG. 9, an alternative embodiment of the diagnostic logic 190b of a receiving device is illustrated. The embodiment illustrated in FIG. 9 is for periodic monitoring of the receiver side diagnostics. In this regard, a predetermined delay (step 802) is designed into the receiver. Thereafter, the receiver (at step 804) determines whether a connectivity test is active. If so, then it determines whether a predetermined interval of time has elapsed (step 806), and if so, then it indicates the connectivity test has failed (step 808). At step 810, it determines whether the monitor test is active, and if so, whether a minimum number of packets have been received (step 812). If not, then it reports the pattern test is out of synchronization (step 814) and returns to step 802. If, however, the monitor test is active, and a minimum number of packets has been received correctly, the receiver reports that the pattern test is in synchronization (step 816).

Referring next to FIG. 10, a flowchart illustrates the diagnostic logic 190c guiding the top-level operation of a transmitter. Illustrated as an initial step, the transmitter tests for commands received from other devices requesting the initiation of diagnostic sequences (step 902). More specifically, the transmitting device may initiate its own diagnostic sequences, or it may initiate diagnostic sequences pursuant to instructions from a remote device. If a remote test is requested, then the system, at step 904, will generate the remote test in accordance with the instruction received, and will transmit an appropriate packet or packets of data along the diagnostic channel (step 906). Otherwise, the transmitter will look to determine whether a connectivity test is requested (step 908). If so, then it will generate a connectivity test packet (step 910) and send that packet on the diagnostic channel to the remote receiving device.

If step 908 resolves to NO, the transmitter will look to determine whether a pattern test is requested (step 912). If not, then it returns to step 902. If so, however, then it generates pattern data, divides that data into data packets, and assigns each packet a particular sequence number (step 914). It then sends these packets one by one to a remote receiving device, on the diagnostic channel (step 916). At step 918, the transmitter waits for a predetermined period of time before continuing to send packets.

Again, the flow charts of FIGS. 8, 9, and 10 are provided to merely illustrate the diagnostic capabilities of the present invention. The particular tests and manner of carrying out the diagnostic routines can be implemented in a wide variety of ways, consistent with the concepts and teaching of the present invention, which is merely to provide non-disruptive diagnostics over a virtual circuit by reserving or dedicating (by address) a unique channel for diagnostic communications. All diagnostic communications between a transmitting device and a receiving device are carried out over this uniquely defined channel.

Many variations and modifications may be made to the preferred embodiment of the invention without departing substantially from the spirit and principles of the invention. All such modifications and variations are intended to be included herein within the scope of the present invention, as defined by the following claims.

What is claimed is:

1. A system for communicating data traffic between a first device and a second device while providing non-disruptive diagnostics therebetween, the system comprising:
   means for transmitting the data traffic between the first device and the second device, the means for transmitting the data traffic including a virtual circuit across hybrid ATM/frame relay network, the virtual circuit having a plurality of logical channels; and
   means for translating the data traffic from an ATM cell format into frame relay format and vice versa.

2. The system of claim 1, further comprising:
   means for designating one of the plurality of logical channels for diagnostic communication by assigning a unique diagnostic channel address; and
   means associated with both the first and second devices for identifying data traffic assigned to the diagnostic logical channel.

3. The system of claim 2, further comprising:

means associated with both the first and second devices for generating a test sequence, the means for generating the test sequence including means for assigning the test sequence to the diagnostic logical channel; and means associated with both the first and second devices for generating a response sequence responsive to the test sequence, the means for generating the response sequence including means for assigning the response sequence to the diagnostic logical channel.

4. The system of claim 3, further comprising:

means associated with both the first and second devices for placing the test sequence into the data traffic transmitted across the virtual circuit;

means associated with both the first and second devices for placing the response sequence into the data traffic transmitted across the virtual circuit; and means associated with both the first and second devices for evaluating a test executed by the transmission of the test sequence and the response sequence across the diagnostic logical channel.

5. The system of claim 4, wherein the means for assigning the test sequence to the diagnostic logical channel further comprises means for adding a diagnostic flag and address to a header of the test sequence.

6. The system of claim 4, wherein the means for assigning the response sequence to the diagnostic logical channel further comprises means for adding a diagnostic flag and address to a header of the response sequence.

7. The system of claim 5, wherein the test sequence is one or more selected from the group consisting of a pattern message, a connectivity request, a start-send pattern command, a start loopback command, a start monitor pattern command, and a start-send pattern command.

8. The system of claim 5, further comprising means for defining the plurality of logical circuits.

9. A system for communicating data traffic between a first device and a second device while providing non-disruptive diagnostics therebetween, the system comprising:

means for transmitting the data traffic between the first device and the second device, the means for transmitting data traffic including a virtual circuit across an asynchronous transfer mode (ATM) network, the virtual circuit having a plurality of logical channels; and means associated with both the first and second devices for translating the data traffic from an ATM cell format into frame relay format and vice versa.

10. The system of claim 9, further comprising:

means for designating one of the plurality of logical channels for diagnostic communication by assigning a unique diagnostic channel address; and means associated with both the first and second devices for identifying data traffic assigned to the diagnostic logical channel.

11. The system of claim 10, further comprising:

means associated with both the first and second devices for generating a test sequence, the means for generating the test sequence including means for assigning the test sequence to the diagnostic logical channel; and means associated with both the first and second devices for generating a response sequence responsive to the test sequence, the means for generating the response sequence including means for assigning the response sequence to the diagnostic logical channel.

12. The system of claim 11, further comprising:

means associated with both the first and second devices for placing the test sequence into the data traffic transmitted across the virtual circuit;

means associated with both the first and second devices for placing the response sequence into the data traffic transmitted across the virtual circuit; and means associated with both the first and second devices for evaluating a test executed by the transmission of the test sequence and the response sequence across the diagnostic logical channel.

13. The system of claim 12, wherein the means for assigning the test sequence to the diagnostic logical channel further comprises means for adding a diagnostic flag and address to a header of the test sequence.

14. The system of claim 12, wherein the means for assigning the response sequence to the diagnostic logical channel further comprises means for adding a diagnostic flag and address to a header of the response sequence.

15. The system of claim 13, wherein the test sequence is one or more selected from the group consisting of a pattern message, a connectivity request, a start-send pattern command, a start loopback command, a start monitor pattern command, and a start-send pattern command.

16. The system of claim 13, further comprising means for defining the plurality of logical circuits.

17. A device for communicating data traffic across a virtual circuit having a plurality of logical channels in an asynchronous transfer mode (ATM) network while providing non-disruptive diagnostics, comprising:

a processor coupled to a local interface;

a serial communications controller circuit coupled to the local interface having a data input/output through which data traffic is sent and received;

a segment assembler/reassembler circuit coupled to the local interface having an input/output through which data traffic is sent and received, the input/output being adapted to be coupled to the ATM network;

a memory coupled to the local interface; and operating logic stored on the memory, the processor operating pursuant to the operating logic, the operating logic being adapted to communicate diagnostic data with a second device a designated channel of the virtual circuit.

18. The system of claim 17, wherein the operating logic further comprises:

logic adapted to designate one of a plurality of logical channels for diagnostic communication by assigning a unique diagnostic channel address; and logic adapted to identify data traffic received from a second device assigned to the diagnostic logical channel.

19. The system of claim 18, wherein the operating logic further comprises:

logic adapted to generate a test sequence that is assigned to the diagnostic logical channel;

logic adapted to generate a response sequence responsive to a test sequence received on the diagnostic logical channel, the response sequence being assigned to the diagnostic logical channel;

logic adapted to place the test sequence into the data traffic transmitted across the virtual circuit; and logic adapted to place the response sequence into the data traffic transmitted across the virtual circuit.

20. The system of claim 19, wherein the operating logic further comprises logic adapted to evaluate a test executed by the transmission of the test sequence and the response sequence across the diagnostic logical channel.

21. The system of claim 20, wherein the logic adapted to assign the test sequence to the diagnostic logical channel further comprises logic adapted to add a diagnostic flag and address to a header of the test sequence.

22. The system of claim 20, wherein the logic adapted to assign the response sequence to the diagnostic logical channel further comprises logic adapted to add a diagnostic flag and address to a header of the response sequence.

23. The system of claim 21, wherein the test sequence is one or more selected from the group consisting of a pattern message, a connectivity request, a start-send pattern command, a start loopback command, a start monitor pattern command, and a start-send pattern command.

24. The system of claim 21, further comprising logic adapted to define the plurality of logical circuits.

25. A method for communicating data traffic between a first device and a second device while providing non-disruptive diagnostics therebetween, the method comprising the steps of:

transmitting the data traffic between the first device and the second device across a virtual circuit in a hybrid ATM/frame relay network, the virtual circuit having a plurality of logical channels;

identifying data traffic received by the first and second devices that is assigned to the diagnostic logical channel;

translating the data traffic from an ATM cell format into frame relay format and vice versa in both the first and second devices; and designating one of the plurality of logical channels for diagnostic communication by assigning a unique diagnostic channel address.

26. The method of claim 25, further comprising the steps of:

generating a test sequence;

assigning the test sequence to the diagnostic logical channel;

transmitting the test sequence between the first and second devices by placing the test sequence into the data traffic transmitted across the virtual circuit;

generating a response sequence responsive to the test sequence;

assigning the response sequence to the diagnostic logical channel; and transmitting the response sequence between the first and second devices by placing the response sequence into the data traffic transmitted across the virtual circuit.

27. The method of claim 26, further comprising the step of evaluating a test executed by the transmission of the test sequence and the response sequence across the diagnostic logical channel.

28. The method of claim 27, wherein the step of assigning the test sequence to the diagnostic logical channel further comprises the step of adding a diagnostic flag and address to a header of the test sequence.

29. The method of claim 27, wherein the step of assigning the response sequence to the diagnostic logical channel further comprises the step of adding a diagnostic flag and address to a header of the response sequence.

30. The method of claim 28, further comprising the step of defining the plurality of logical circuits.

31. A method for communicating data traffic between a transmitting device and a receiving device while providing non-disruptive diagnostics therebetween, the method comprising the steps of:

transmitting the data traffic between the transmitting device and the receiving device across a virtual circuit in an asynchronous transfer mode (ATM) network, the virtual circuit having a plurality of logical channels;

translating the data traffic from an ATM cell format into frame relay format and vice versa;

designating one of the plurality of logical channels for diagnostic communication by assigning a unique diagnostic channel address; and identifying data traffic received by the first and second devices that is assigned to the diagnostic logical channel.

32. The method of claim 31, further comprising the steps of:

generating a test sequence;

assigning the test sequence to the diagnostic logical channel;

placing the test sequence into the data traffic transmitted across the virtual circuit;

generating a response sequence responsive to the test sequence;

assigning the response sequence to the diagnostic logical channel; and placing the response sequence into the data traffic transmitted across the virtual circuit.

33. The method of claim 32, further comprising the step of evaluating a test executed by the transmission of the test sequence and the response sequence across the diagnostic logical channel.

34. The method of claim 33, wherein the step of assigning the test sequence to the diagnostic logical channel further comprises the step of adding a diagnostic flag and address to a header of the test sequence.

35. The method of claim 33, wherein the step of assigning the response sequence to the diagnostic logical channel further comprises the step of adding a diagnostic flag and address to a header of the response sequence.

36. The method of claim 34, further comprising the step of defining the plurality of logical circuits.

37. A data communications device for providing end-to-end data management over a virtual circuit in an asynchronous transfer mode (ATM) network, comprising:

a processor coupled to a local interface;

a serial communications controller circuit coupled to the local interface having a data input/output through which data traffic is transmitted and received;

a segment assembler/reassembler circuit coupled to the local interface having an input/output through which data traffic is transmitted and received, the input/output being adapted for coupling to the ATM network;

a memory coupled to the local interface; and operating logic stored on the memory, the processor operating pursuant to the operating logic, the operating logic including:

logic to establish a channel flag, a first header, and a second header associated with data relayed via a first logical channel and a second logical channel over the virtual circuit in the asynchronous transfer mode network, respectively; and logic to multiplex associated frames of a first data stream and a second data stream with the first and second logical channels, respectively, by inserting said channel flag and said second header into each frame of the second data stream and the first header into only frames of the first data stream for which the associated flags match the channel flag, the first and second logical channels being multiplexed over the virtual circuit in the asynchronous transfer mode network, wherein the frames of the first data stream are free of the first header to reduce an overhead of the data communications device.

38. A data communications device for providing end-to-end data management over a virtual circuit in an asynchronous transfer mode (ATM) network, comprising:

means for establishing a channel flag, a first header, and a second header associated with data relayed via a first logical channel and a second logical channel over the virtual circuit in the asynchronous transfer mode network, respectively; and means for multiplexing associated frames of a first data stream and a second data stream with the first and second logical channels, respectively, by inserting said channel flag and said second header into each frame of the second data stream and the first header into only frames of the first data stream for which the associated flags match the channel flag, the first and second logical channels being multiplexed over the virtual circuit in the asynchronous transfer mode network, wherein the frames of the first data stream are free of the first header to reduce an overhead of the data communications device.

39. A method providing end-to-end data management of data communications over a virtual circuit in an asynchronous transfer mode (ATM) network, comprising:

establishing a channel flag, a first header, and a second header associated with data relayed via a first logical channel and a second logical channel over the virtual circuit in the asynchronous transfer mode network, respectively; and multiplexing associated frames of a first data stream and a second data stream with the first and second logical channels, respectively, by inserting said channel flag and said second header into each frame of the second data stream and the first header into only frames of the first data stream for which the associated flags match the channel flag, the first and second logical channels being multiplexed over the virtual circuit in the asynchronous transfer mode network, wherein the frames of the first data stream are free of the first header to reduce an overhead of the data communications device.

40. A data communications device for providing end-to-end data management over a virtual circuit in a hybrid asynchronous transfer mode (ATM)/frame relay network, comprising:

a processor coupled to a local interface;

a serial communications controller circuit coupled to the local interface having a data input/output through which data traffic is transmitted and received;

a segment assembler/reassembler circuit coupled to the local interface having an input/output through which data traffic is transmitted and received, the input/output being adapted for coupling to the hybrid asynchronous transfer mode/frame relay network;

a memory coupled to the local interface; and operating logic stored on the memory, the processor operating pursuant to the operating logic, the operating logic including:

logic to establish a channel flag, a first header, and a second header associated with data relayed via a first logical channel and a second logical channel over the virtual circuit in the hybrid asynchronous transfer mode (ATM)/frame relay network, respectively; and logic to multiplex associated frames of a first data stream and a second data stream with the first and second logical channels, respectively, by inserting said channel flag and said second header into each frame of the second data stream and the first header into only frames of the first data stream for which the associated flags match the channel flag, the first and second logical channels being multiplexed over the virtual circuit in the hybrid asynchronous transfer mode (ATM)/frame relay network, wherein the frames of the first data stream are free of the first header to reduce an overhead of the data communications device.

41. A data communications device for providing end-to-end data management over a virtual circuit in a hybrid asynchronous transfer mode (ATM)/frame relay network, comprising:

means for establishing a channel flag, a first header, and a second header associated with data relayed via a first logical channel and a second logical channel over the virtual circuit in the hybrid asynchronous transfer mode (ATM)/frame relay network, respectively; and means for multiplexing associated frames of a first data stream and a second data stream with the first and second logical channels, respectively, by inserting said channel flag and said second header into each frame of the second data stream and the first header into only frames of the first data stream for which the associated flags match the channel flag, the first and second logical channels being multiplexed over the virtual circuit in the hybrid asynchronous transfer mode (ATM)/frame relay network, wherein the frames of the first data stream are free of the first header to reduce an overhead of the data communications device.

42. A method providing end-to-end data management of data communications over a virtual circuit in a hybrid asynchronous transfer mode (ATM)/frame relay network, comprising:

establishing a channel flag, a first header, and a second header associated with data relayed via a first logical channel and a second logical channel over the virtual circuit in the hybrid asynchronous transfer mode (ATM)/frame relay network, respectively; and multiplexing associated frames of a first data stream and a second data stream with the first and second logical channels, respectively, by inserting said channel flag and said second header into each frame of the second data stream and the first header into only frames of the first data stream for which the associated flags match the channel flag, the first and second logical channels being multiplexed over the virtual circuit in the hybrid asynchronous transfer mode (ATM)/frame relay network, wherein the frames of the first data stream are free of the first header to reduce an overhead of the data communications device.

* * * * *